United States Patent Office 3,527,844
Patented Sept. 8, 1970

3,527,844
PIGMENT CONCENTRATE COMPRISING AN AMORPHOUS ETHYLENE/PROPYLENE BLOCK COPOLYMER AND A CRYSTALLINE ALPHA-OLEFIN POLYMER
David C. Hull, Hugh J. Hagemeyer, Jr., and Raymond L. Etter, Jr., Longview, Tex., assignors to Eastman Kodak Company, Rochester, N.Y., a corporation of New York
No Drawing. Continuation of application Ser. No. 308,666, Sept. 13, 1963. This application Apr. 4, 1968, Ser. No. 718,953
Int. Cl. C08f *29/12*
U.S. Cl. 260—876
10 Claims

ABSTRACT OF THE DISCLOSURE

Pigment concentrate consisting essentially of a finely divided pigment dispersed in a mixture of 10–90% by weight propylene-ethylene block copolymer having a viscosity at 150° C. of 5000 to 300,000 cps. and 10–90% by weight low molecular weight crystalline polypropylene or crystalline block copolymer containing at least 80% polymerized propylene and the remainder other alpha-monoolefin.

---

This application is a continuation of Ser. No. 308,666, filed Sept. 13, 1963, now abandoned.

This invention broadly relates to improved systems for dispersing particulate materials in polymeric masses, and especially concerns their manufacture and use in the form of color concentrates comprising pigments dispersed in improved resinous carriers. While the present invention is useful for filling and extending polymeric masses in general, it can be adequately described by reference to its use in the pigmentation of polyolefins, and such description shall henceforth be given for the sake of simplicity rather than limitation. The term "pigment" as hereinafter used includes all kinds of particulate organic and inorganic coloring materials.

Color concentrates comprising pigmented carriers such as thermoplastic resinous materials are conventionally blended with polymeric materials including polyolefins to impart color thereto. In the use of such concentrates, the homogeniety or uniformity of the pigment dispersion in the final product depends, of course, on the uniformity of the pigment dispersion in the pigment carrier. For example, if agglomerated pigment particles are present in the concentrate, agglomerated pigment will exist in the final article and detract from its appearance, i.e., render the color grainy and non-uniform. While in most instances the prior art concentrates have been satisfactory, they have not overcome the agglomeration problem in the coloring of polypropylene which wets pigment particles only poorly and prevents proper dispersal thereof.

Objects of the present invention, therefore, are: to produce polymeric articles having uniform dispersals of pigment therein and almost a complete absence of agglomerates; to provide pelleted color concentrates exhibiting improved pigment dispersions and amenable to low-cost blending with resin systems; and to provide color concentrates useful for coloring a large variety of resinous materials, thereby reducing the number of concentrate types heretofore required for large-scale and varied coloring operations.

These and other objects have been achieved according to the present invention through the discovery that amorphous block copolymers of propylene and ethylene when admixed with low-molecular-weight crystalline polypropylene or polyallomers, readily wet out pigment particles, effectively inhibit agglomeration thereof, and can be formed into non-tacky shippable pelleted color concentrates. The inherently low viscosity of these mixtures and their pigment wetting propensities render uniform coloring thereof a relatively simple matter. The amounts of amorphous block copolymer in the carrier composition can range from 10–90 percent by weight with the preferred amorphous content being from about 45 to about 65 percent by weight. The equipment necessary for forming such concentrates is simple and inexpensive due to the relatively low viscosity of these carriers and their ability to properly disperse the pigment at temperatures between 100 and 250° C.

The amorphous block copolymers of propylene and ethylene are produced by ionic polymerization methods and have a randon arrangement of the methyl groups about the asymmetric carbon atoms. The copolymers useful in the present invention may vary in viscosity from 5,000 to 300,000 cps. at 150° C. with the preferred viscosity in the range of 20,000 to 200,000 cps. at 150° C. The ethylene content of the copolymer may vary between about 1 and about 50 percent by weight, with the preferred ethylene content being between about 1 and about 30 percent by weight. At ethylene contents above about 50 percent by weight, the copolymer becomes very viscous and loses the flow and processing properties so important to the present invention.

The block copolymers may be prepared, for example, either by direct polymerization to essentially 100% amorphous polymer or by hexane extraction of gross polyallomer. Many variants of these procedures are known and the block copolymers produced thereby may be employed in the present invention.

In general, it may be said that all catalyst systems produce some amorphous block copolymers. The amount of amorphous produced varies with the individual system. Such systems are comprised of a compound of an element from the fourth to sixth subgroups of the periodic table and a metal, alloy, metal hydride, or organometallic compound from the first to third groups. The compounds from the first to third groups include aluminum alkyls, alkali metal alkyls, zinc, or magnesium alkyls, aluminum alkyl halides, aluminum alkyl hydrides, alkali metal aluminum hydrides, alkali metal aluminum halides, and the like. The compounds of elements from the fourth and sixth subgroups include the halides of titanium and zirconium as well as the alkyl esters of orthotitanic acid and compounds of chromium and vanadium.

A catalyst which produces large amounts of amorphous block copolymers can be prepared from aluminum compounds of either $R_2AlX$ or $RAlX_2$ or mixtures of these types where R represents an alkyl or aryl hydrocarbon radical and X represents a halogen, and titanium compounds of either

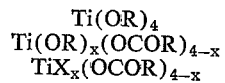

or

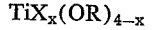

type where R represents an alkyl hydrocarbon radical containing 4–14 carbon atoms and X represents a halogen. Typical aluminum compounds used include $Et_2AlBr$, $EtAlCl_2$, $Et_3Al_2Cl_3$, etc. Typical titanium compounds used include tetrastearyl titanate, tetrabutyl titanate, and isoproxy titanium stearate.

The direct polymerization process was carried out as follows:

A mixture of 500 ml. of heptane, 5.0 ml. of ethyl aluminum sesquibromide and 3.75 ml. of tetra-2-ethylhexyl titanate was prepared in a nitrogen atmosphere. While stirring this mixture, propylene gas was introduced for 28 minutes followed by introduction of ethylene gas for two minutes. The temperature rose to about 60° C. and was maintained between 50–60° C. throughout the reaction period. Four separate additions of propylene and ethylene were made as above over a two-hour period. The solid amorphous block copolymer obtained had an ethylene content of about 16%.

The polyallomer preparation and heptane extraction process may be carried out as follows:

An 82-gallon stirred autoclave is purged with propylene and charged with 40 gallons of mineral spirits. Twenty g. of lithium aluminum hydride, 22 g. of sodium fluoride and 80 g. of titanium trichloride are charged to the reactor and propylene is added to bring the pressure to 100 p.s.i.g. The vessel is heated to 150° C. and propylene is fed to bring the pressure to 450 p.s.i.g. After six hours at 450 p.s.i.g. and 150° C., unreacted propylene is vented and the vessel repressured to 50 p.s.i.g. with dry nitrogen. The vessel is flushed with nitrogen three times and then ethylene gas is added to a pressure of 50 p.s.i.g. Polymerization is sustained until the desired ethylene content is reached. The polymer solution is concentrated, extruded into strands, and chopped into pellets. The pellets are extracted with hexane at 60° C. for 12 hours. The hexane is removed from the amorphous block copolymer and the polymer is pumped into silicone lined boxes. The amorphous block copolymer is a solid, slightly tacky material.

These amorphous block copolymers may be used alone as the colorant carrier, but, preferably are admixed with various amounts, 10 to 90 percent by weight, of low-molecular-weight crystalline polypropylene or polyallomer in order to render the pellets non-tacky and shippable.

The low-molecular-weight crystalline polypropylene and polyallomer may each be made directly in the polymerization reactor to an I.V. of 0.2–1.1 measured in tetralin at 145° C., or obtained by the thermal degradation of the high-molecular-weight crystalline material to the same I.V. The thermal degradation, for example, may be carried out according to the process of U.S. Pat. No. 2,835,659, which essentially comprises heating at a temperature of 300–450° C., crystalline polypropylene having a density of at least 0.90 and an average molecular weight of at least 20,000, until the molecular weight is reduced to a value within the range of 1000–8000.

The polyallomers are solid, crystalline polymers in which the polymer chains comprise two separate and distinct crystalline segments, i.e., a body segment and a chain segment. The polyallomers found especially useful are those containing segments of polypropylene and polyethylene, or segments of polypropylene and poly-1-butene.

These polyallomers are made by initially polymerizing propylene and then polymerizing a different alpha-monoolefinic hydrocarbon such as ethylene or butene-1 in the presence of the polymerized propylene until a polymer containing at least 80 percent by weight of polymerized propylene and at least 0.1 percent by weight of the polymerized alpha-mono-olefinic hydrocarbon forms. The polymerization is carried out at a temperature in the range of about 0 to about 300° C. and a pressure from about 1 to about 2,000 atmospheres in the presence of a solid stereospecific polymerization catalyst, one component of which being a halide of a transition metal from Group IV–B to Group VI–B of the Periodic Table and the second component being selected from the following: (a) aluminum, (b) a metal from Group I–A to Group II of the Periodic Table, (c) alloys, halides, complex hydrides and organo derivatives of aluminum or a metal from Group I–A to Group II of the Periodic Table, and (d) a complex organo-metallic compound comprising a metal from Group I–A to Group II of the Periodic Table and either aluminum and boron.

The coloring agents which are utilized in this invention are either inorganic or organic pigments or dyes. Some of the representative pigments and dyes are: copper phthalocyanines, chlorinated copper phthalocyanines, sulfonated copper phthalocyanines, alizarin pigments, quinoline dyes, titanium dioxide, and all cadmium pigments such as Cadmium yellow, Cadmium orange, and Cadmium red. Various other pigments identified only by the manufacturers' name such as Hostaperm fast red, Zulu green and Zulu blue can also be used. Excellent dispersions are also obtained using various grades of carbon black.

Various antioxidant combinations may be used in the concentrates. We prefer to use additional antioxidant for the polypropylene where greater stabilization is required for the processing. The preferred loading is 0.5% dilauryl thiodipropionate and 0.3% Santowhite powder (Monsanto Chemical Company) or other suitable phenolic-type antioxidant. On some of the pigments such as the copper salts we prefer to add corrosion inhibitors such as oxanolide to prevent agglomeration by the interaction of the copper with the polypropylene.

The incorporation of the colorant in the carriers of this invention is achieved by two general methods; melt blending, and solvent blending. Melt blending involves melting the carrier in a melt pot or mixer such as a sigma blade mixer at temperatures in the range of 100–250° C. The colorant is then added in small portions to the agitated melt in order to insure good dispersion. The agitation should be thorough but need be neither rapid nor of high shear. After colorant addition is completed, agitation is continued until the complete dispersion thereof is obtained. The concentrate is then removed by pumping or extruding into cooling troughs, stranded and then cut into pellets. The solvent blending method involves adding small quantities of a solvent such as mineral spirits or xylene to the carrier and heating the resultant mixture to the solution point at which time the colorant in solvent is added to the agitated solution. After complete mixing has been achieved, the solvent is removed by distillation or gas stripping and the molten concentrate is treated as in the melt method above.

EVALUATION OF THE DISPERSIONS

Illustrative concentrates of the present invention were evaluated according to the following three procedures:

*Procedure I.*—Concentrate samples were prepared for magnified viewing by placing small amounts thereof between two glass slides, heating the same to a temperature of 150–200° C., pressing the slides together with a 3000-gram weight and allowing the concentrate to cool. The samples thus prepared were then observed under 100× magnification and photomicrographs thereof taken. Dispersion qualities of the samples were judged according to two aspects, namely, (a) the uniformity of the dispersion of the pigment particles, and (b) the absence of pigment particle agglomerates. A quality rating of from Grade 1 to Grade 10 was applied to the samples with Grade 1 indicating excellent uniform pigment particle dispersion and substantially complete absence of particle agglomerates.

*Procedure II.*—The above concentrate samples were then mixed (extended) by an extruder into polyolefin resins to pigment concentrations of about 1% by weight. The dispersion qualities (a) and (b) of samples of these pigmented polyolefin resins were determined as in Procedure I above, using small amounts of the colored polyolefin resins in the slide samples, and likewise given a rating of from Grade 1 to Grade 10.

*Procedure III.*—The polyolefin resins of Procedure II above were then extruded into flat film samples which were evaluated according to four aspects; (a), (b), (c), and (d), and given a rating of from Grade 1 to Grade 10. Aspects (a) and (b) were determined by Procedure II above, using small amounts of the colored polyolefin resin films in the slide preparations. Aspect (c) consisted of a non-magnified visual determination of the uniformity of color of the film samples, and aspect (d) consisted of a non-magnified visual determination of the presence of pigment specks in the film samples. In these Grade ratings, aspects (a) through (d) were given equal weight.

The following specific examples will serve to further illustrate the invention.

Example No. 1

To a 2-liter resin kettle fitted with an anchor-type stirrer were added 400 grams of amorphous block copolymer of propylene and ethylene (percent ethylene=3.0%, viscosity=40,000 cps. at 150° C.) and 300 grams of low-molecular-weight crystalline polypropylene (viscosity at 190° C.=4000 cps., I.V.=0.54). This mixture was heated and agitated at 190° to 210° C. until the polymers were molten and fluid, at which point 300 grams of Zulu green (a copper phthalocyanine pigment) was added in 30 to 50 gram portions. After pigment addition was complete, the agitation was continued for four hours, after which the concentrate was poured into a pan, allowed to cool, and then granulated. Dispersion quality evaluation of the concentrate was excellent (Grade 3), of the extended concentrate was excellent (Grade 2), and of the film was excellent (Grade 1). Plates molded from this concentrate, and polymeric film containing the same in extended form also showed a greater depth of color for the same pigment concentration than those prepared by the Banbury method.

Example No. 2

This example demonstrates the results obtainable with pigment concentrates prepared by the Banbury method. A conventional Banbury mill was used to disperse 30% Zulu green pigment in conventional crystalline polypropylene (I.V.=1.8). A milling time of 30 minutes was used after which the concentrate was removed and diced. This material was evaluated as in Example No. 1. The dispersion quality of the concentrate was very poor (Grade 8), of the extended concentrate, poor (Grade 8), and of the film, poor (Grade 7).

Example Nos. 3–8

Example No. 1 was repeated, but, substituting a variety of pigments. The dispersion quality evaluations are shown in Table I below.

TABLE I

| Example No. | Pigment | Dispersion quality of— | | |
|---|---|---|---|---|
| | | Concentrate | Extended concentrate | Film |
| 3 | Cadmium yellow | Excellent, 2 | Excellent, 2 | Excellent, 1. |
| 4 | Cadmium orange | do | do | Do. |
| 5 | Hostaperm red | do | do | Excellent, 2. |
| 6 | TiO₂ white | Excellent, 1 | Excellent, 1 | Excellent, 1. |
| 7 | Zulu blue | Good, 4 | Good, 4 | Good, 4. |
| 8 | Carbon black | Good, 3 | Good, 3 | Good, 3. |

Example No. 9

Example No. 1 was repeated using 400 g. of amorphous block copolymer of ethylene and propylene containing 17.6% by weight of ethylene having an I.V.=0.42 and a viscosity at 150° C. of 140,000, and 300 g. of low-molecular-weight propylene polyallomer containing 1.5% ethylene and having an I.V.=0.8. The dispersion quality of the concentrate was very good (Grade 3), and the concentrate was in the form of tough, hard, easy-to-handle pellets.

Example No. 10

To a 4-liter resin pot was added 400 g. of amorphous block copolymer of propylene and ethylene containing 11.4% by weight of ethylene having an I.V.=0.35 and a viscosity at 150° C. of 95,000 cps., 300 g. of low-molecular-weight crystalline polypropylene (viscosity at 190° C.=425 cps. and I.V.=0.18), and 200 ml. of mineral spirits. The mix was heated to effect solution of the polymers and 300 g. of Cadmium orange pigment and 200 ml. of mineral spirits were added in portions. After pigment addition was completed, the mixture was stirred for two hours and the mineral spirits then removed by distillation. The concentrate was cooled, granulated, and evaluated. The dispersion quality of the concentrate evaluated to Grade 2, of the extended concentrate to Grade 1, and of the film to Grade 1.

Example No. 11

To a 1-gallon heated sigma blade mixer were added 2.0 pounds of amorphous block copolymer of propylene and ethylene (14% ethylene, I.V.=0.42, viscosity=60,000 cps.) and 1.5 pounds of low-molecular-weight crystalline polypropylene (viscosity at 190° C.=3000 cps., I.V.=0.55). The mixer was started and when the materials became molten, one and one-half pounds of Cadmium yellow pigment was added in one-fourth pound portions. After the pigment addition was complete, the mixing was continued until a sample showed good dispersion (Grade 2). The mix was then pumped from the bottom of the tank, cooled, stranded and pelleted. The dispersion quality of the concentrate evaluated to Grade 2, of the extended concentrate to Grade 2, and of the film to Grade 2.

The invention has been described in detail with particular reference to preferred embodiments thereof, but, it will be understood that variations and modifications can be effected within the spirit and scope of the invention as described hereinabove and as defined in the appended claims.

It is claimed:

1. A pigment concentrate comprising a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline α-olefin polymer having an inherent viscosity as measured in tetralin within the range of 0.2 to 1.1 and selected from the group consisting of polypropylene and block copolymers containing at least 80% polymerizing propylene with the remainder being other alpha-monoolefin.

2. A pigment concentrate comprising a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline block copolymer containing at least 80% polymerized propylene and the remainder other alpha-monoolefin, said crystalline block copolymer having an inherent viscosity as measured in tetralin within the range of 0.2 to 1.1.

3. A pigment concentrate, non-tacky at room temperature and comprising a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline polypropylene having an inherent viscosity as measured in tetralin within the range of 0.2 to 1.1.

4. A pigment concentrate comprising a finely divided pigment dispersed in a mixture of amorphous propylene-ethylene block copolymer having a viscosity at 150° C. of from 5000 to 300,000 cps., and low-molecular-weight crystalline polyproylene having an inherent viscosity within the range of 0.2 to 1.1, said mixture comprising at least about 50% by weight of said block copolymer.

5. A pigment concentrate comprising a finely divided pigment dispersed in a mixture of amorphous propylene-ethylene block copolymer having a viscosity at 150° C.

of from 5000 to 300,000 cps., and low-molecular-weight crystalline block copolymer containing at least 80% polymerized propylene and the remainder other alpha-monoolefin, said crystalline block copolymer having an inherent viscosity within the range of 0.2 to 1.1, said mixture comprising at least about 50% by weight of said amorphous block copolymer.

6. A pigment concentrate consisting essentially of a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline polyproplene having an inherent viscosity as measured in tetralin at 145° C. within the range of 0.2 to 1.1.

7. A pigment concentrate consisting essentially of a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline block copolymer containing at least 80% polymerized propylene and the remainder other alpha-monoolefin, said crystalline block copolymer having an inherent viscosity within the range of 0.2 to 1.1.

8. A pigment concentrate, non-tacky at room temperature consisting essentially of a finely divided pigment dispersed in a mixture of 45–65% by weight amorphous propylene-ethylene block copolymer having a viscosity at 150° C. of from 5000 to 300,000 cps., and 55–35% by weight low-molecular-weight crystalline polypropylene having an inherent viscosity as measured in tetralin at 145° C. within the range of 0.2 to 1.1.

9. A pigment concentrate consisting essentially of a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline polypropylene having an inherent viscosity as measured in tetralin at 145° C. within the range of 0.2 to 1.1, said mixture comprising at least about 50% by weight of said block copolymer.

10. A pigment concentrate consisting essentially of a finely divided pigment dispersed in a mixture of 10–90% by weight amorphous propylene-ethylene block copolymer having a viscosity at 150° C. of from 5000 to 300,000 cps., and 10–90% by weight low-molecular-weight crystalline block copolymer containing at least 80% polymerized propylene and the remainder other alpha-monoolefin, said crystalline block copolymer having an inherent viscosity as measured in tetralin at 145° C. within the range of 0.2 to 1.1, said mixture comprising at least about 50% by weight of said block copolymer.

References Cited

UNITED STATES PATENTS 3,271,354   9/1966   Weissert et al.

FOREIGN PATENTS 638,040   3/1962   Canada.

OTHER REFERENCES

Naffa-Properties of Olefins-Jour. P.S., pp. 542–543, 1959.

MURRAY TILLMAN, Primary Examiner

C. J. SECCURO, Assistant Examiner

U.S. Cl. X.R.

260—41, 897